United States Patent
Park et al.

(10) Patent No.: US 10,440,975 B2
(45) Date of Patent: Oct. 15, 2019

(54) FEED ADDITIVE COMPOSITION FOR REDUCING METHANE GAS PRODUCED BY RUMINANT ANIMALS

(71) Applicant: CJ CHEILJEDANG CORPORATION, Seoul (KR)

(72) Inventors: Min Ah Park, Incheon (KR); Seung Heon Lee, Incheon (KR); Sung Hun Kim, Siheung-si (KR); In Bae Kim, Seongnam-si (KR); Si Yong Yang, Incheon (KR); Seok Woo Chee, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 314 days.

(21) Appl. No.: 15/315,593

(22) PCT Filed: Jun. 2, 2015

(86) PCT No.: PCT/KR2015/005541
§ 371 (c)(1),
(2) Date: Dec. 1, 2016

(87) PCT Pub. No.: WO2015/186956
PCT Pub. Date: Dec. 10, 2015

(65) Prior Publication Data
US 2017/0196240 A1    Jul. 13, 2017

(30) Foreign Application Priority Data
Jun. 2, 2014 (KR) .................. 10-2014-0067168

(51) Int. Cl.
*A23K 20/137* (2016.01)
*A23K 50/10* (2016.01)
*A23K 20/142* (2016.01)
*A23K 20/111* (2016.01)
*A23K 20/121* (2016.01)
*A23K 20/10* (2016.01)
*A23K 10/30* (2016.01)

(52) U.S. Cl.
CPC .............. *A23K 50/10* (2016.05); *A23K 20/10* (2016.05); *A23K 20/111* (2016.05); *A23K 20/121* (2016.05); *A23K 20/137* (2016.05); *A23K 20/142* (2016.05); *A23K 10/30* (2016.05); *Y02P 60/56* (2015.11)

(58) Field of Classification Search
CPC .... A23K 50/10; A23K 20/137; A23K 20/142; A23K 20/10; A23K 20/111; A23K 20/121; A23K 10/30; Y02P 60/56
See application file for complete search history.

(56) References Cited

U.S. PATENT DOCUMENTS

| 8,771,723 B2 | 7/2014 | Perdok et al. |
| 8,927,565 B2* | 1/2015 | Jin .................. A61K 31/47 514/284 |
| 9,266,814 B2 | 2/2016 | Duval et al. |
| 2007/0027176 A1 | 2/2007 | Jin et al. |
| 2012/0171323 A1* | 7/2012 | Bravo ................ A23K 20/105 426/2 |

FOREIGN PATENT DOCUMENTS

| CN | 101107969 A | 1/2008 |
| CN | 10-2497786 A | 6/2012 |
| JP | 2007-504097 A | 3/2007 |
| JP | 2012-533320 A | 12/2012 |
| JP | 2013-545485 A | 12/2013 |
| KR | 10-2006-0019062 A | 3/2006 |
| KR | 10-2011-0036470 A | 4/2011 |
| KR | 10-2012-0104309 A | 9/2012 |
| WO | 2005/020997 A1 | 3/2005 |
| WO | 2009/150264 A1 | 12/2009 |
| WO | 2011/070133 A1 | 6/2011 |
| WO | 2013/182038 A1 | 12/2013 |

OTHER PUBLICATIONS

Busquet, M et al. J Dairy Sci., 83:4393-4404 (Year: 2005).*
Vigortone, downloaded from www.vigortone.com/dairy/CinnaGar%20page.pdf,dated Jun. 2009, 2 pages (Year: 2009).*
Kamel et al. "Garlic and Cinnamon for a healthy working rumen", 3 pages, Sep. 2007, from AllAboutFeed News, (Year: 2007).*
Calsamiglia et al. J Dairy Sci. 90, pp. 2580-2595, 2007 (Year: 2007).*
Calsamiglia et al. Penn State Dairy Cattle Nutr. Workshop, pp. 87-100, 2007 (Year: 2007).*
Busquet et al. J Dairy Sci. vol. 88, pp. 2508-2516, 2005 (Year: 2005).*
Kamra et al. J Applied Anim. Res. 40:2, pp. 90-96 (Year: 2012).*
Afshar et al. Asian J Biol. Sci, 5(7), pp. 328-340 (Year: 2012).*

(Continued)

*Primary Examiner* — C. Sayala
(74) *Attorney, Agent, or Firm* — Seed IP Law Group LLP

(57) ABSTRACT

The present disclosure relates to a feed additive composition for reducing methane production generated in the ruminant stomach of ruminant animals. Specifically, the present disclosure relates to a feed additive composition for reducing methane production comprising at least one selected from the group consisting of alliin and berberine, more specifically to a feed additive composition for reducing methane production comprising at least one selected from the group consisting of diallyl disulfide (DADS), nitrate, and eucalyptus oil. The feed additive composition according to the present disclosure may be added to the feed without additional treatment, thereby reducing the amount of methane production in the ruminant stomach without negative effects on livestock productivity. Thus, the feed additive composition can be effectively used in the ruminant animal industry.

16 Claims, 4 Drawing Sheets

(56) References Cited

OTHER PUBLICATIONS

Dick Ziggers, article downloaded from https://www.allaboutfeed.net/Nutrition/Research/2011/7/Special-feed-halves-methane-production-in-ruminants-AAF011991W/, 2 pages dated Jul. 2011. (Year: 2011).*
Machine translation of patent WO2009150264A1 (Year: 2009).*
Kamra et al., "Inhibition of ruminal methanogenesis by tropical plants containing secondary compounds," *International Congress Series* 1293:156-163, 2006.
Patra et al., "Effects of Essential Oils on Methane Production and Fermentation by, and Abundance and Diversity of, Rumen Microbial Populations," *Applied and Environmental Microbiology* 78(12):4271-4280 (Jun. 2012).
Patra et al., "A new perspective on the use of plant secondary metabolites to inhibit methanogenesis in the rumen," *Phytochemistry* 71:1198-1222 (2010).

* cited by examiner

[FIG. 1]
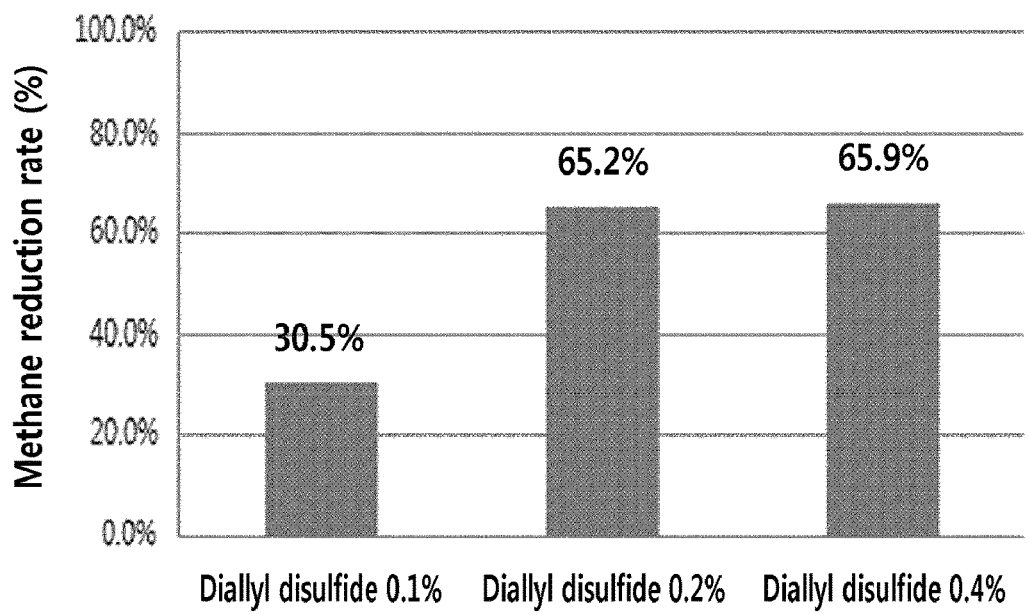
[FIG. 2]
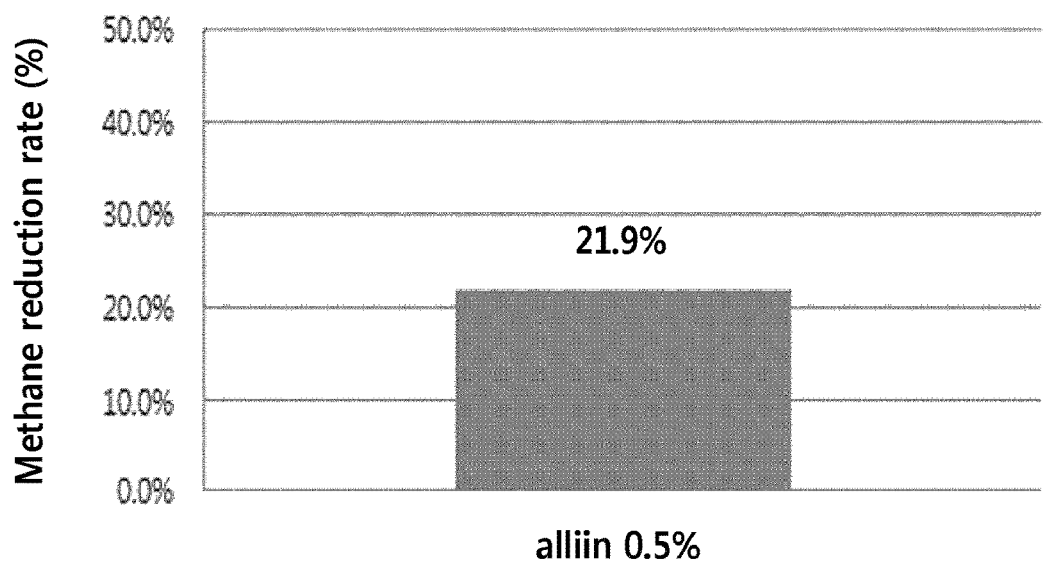

[FIG. 3]
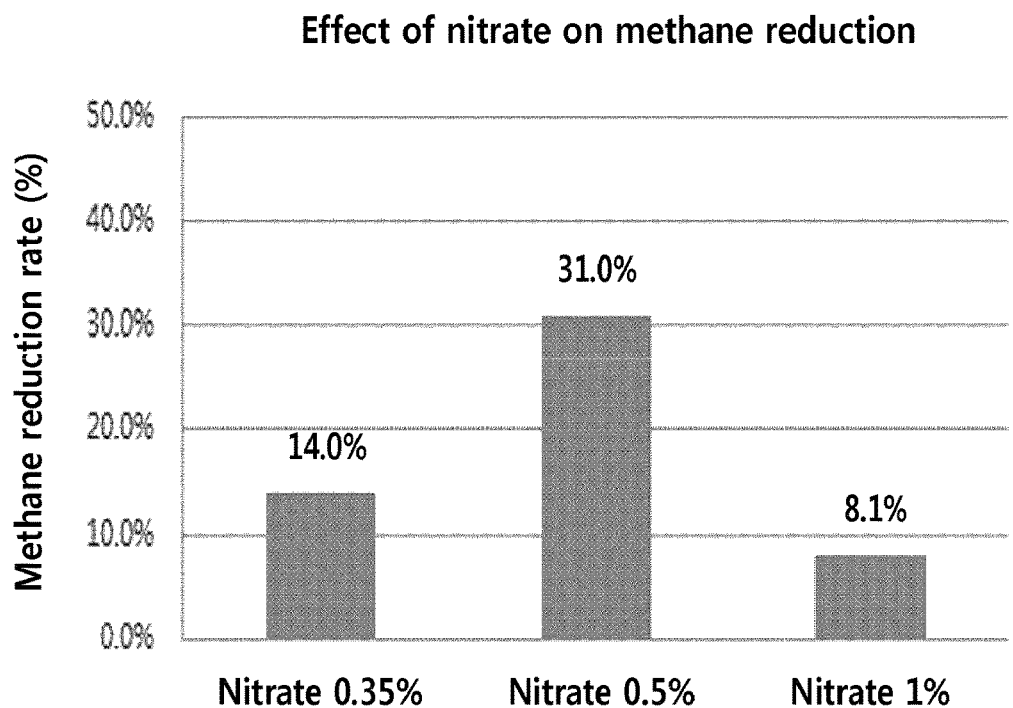
[FIG. 4]
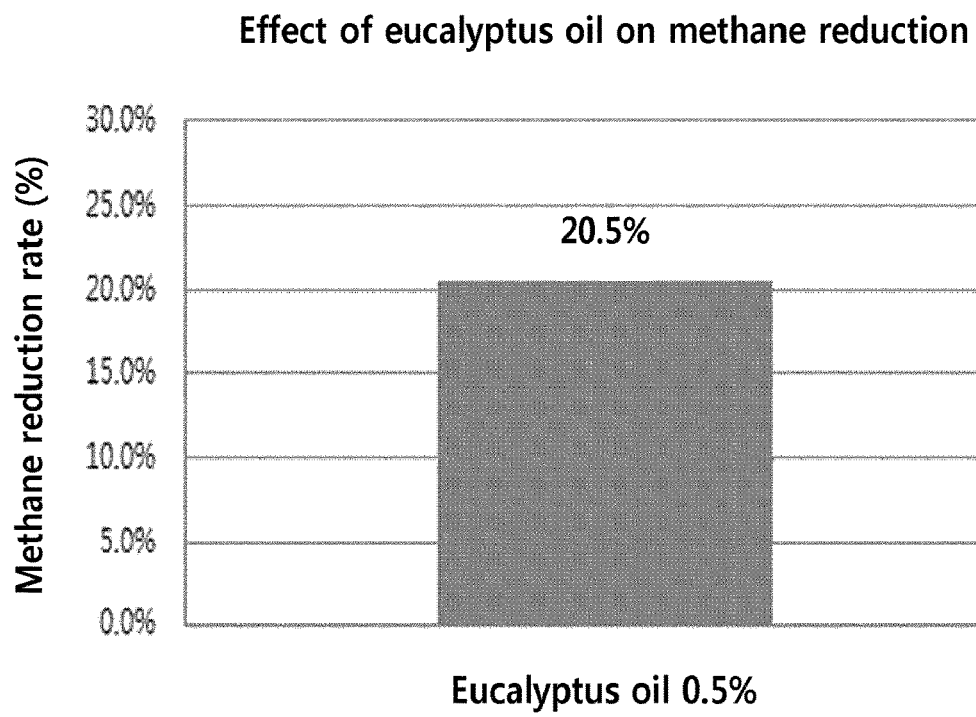

[FIG. 5]
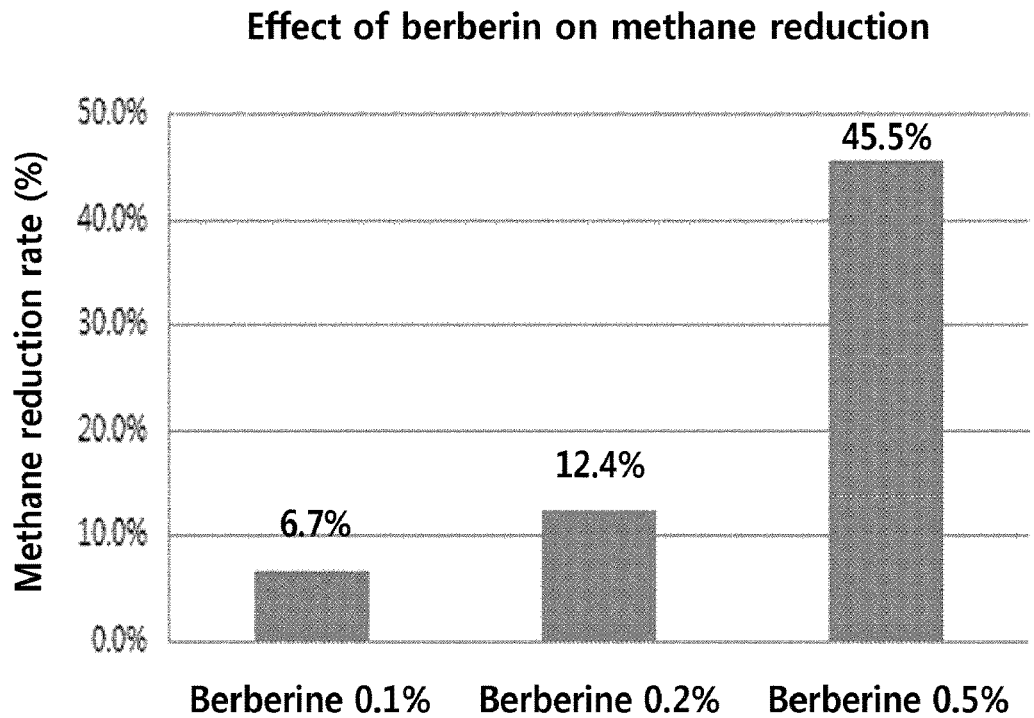
[FIG. 6]
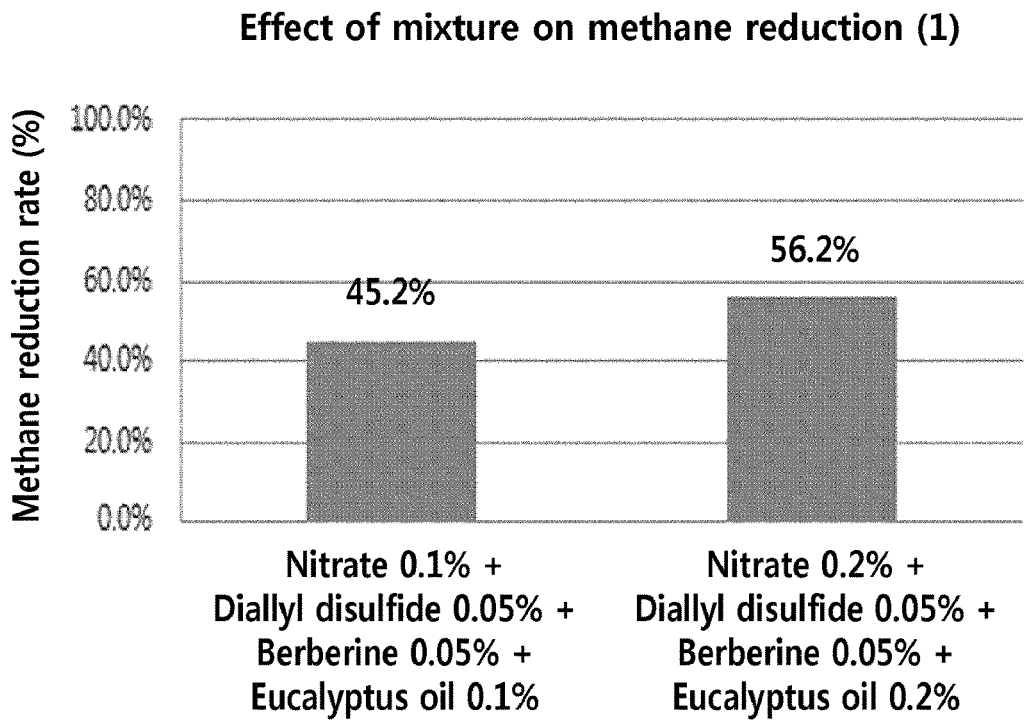

[FIG. 7]
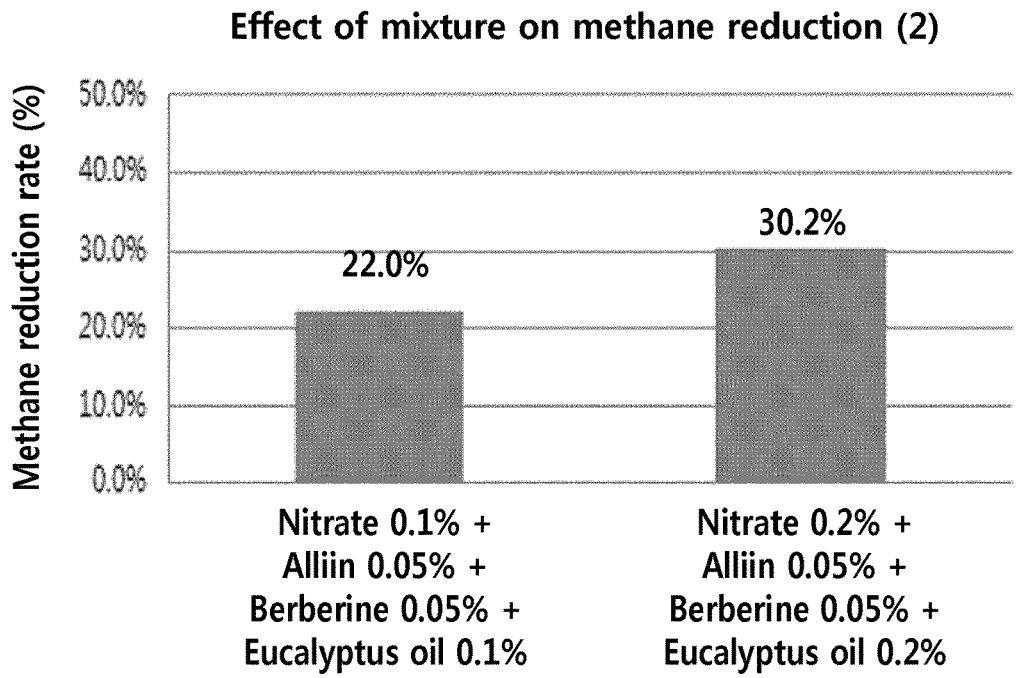
[FIG. 8]
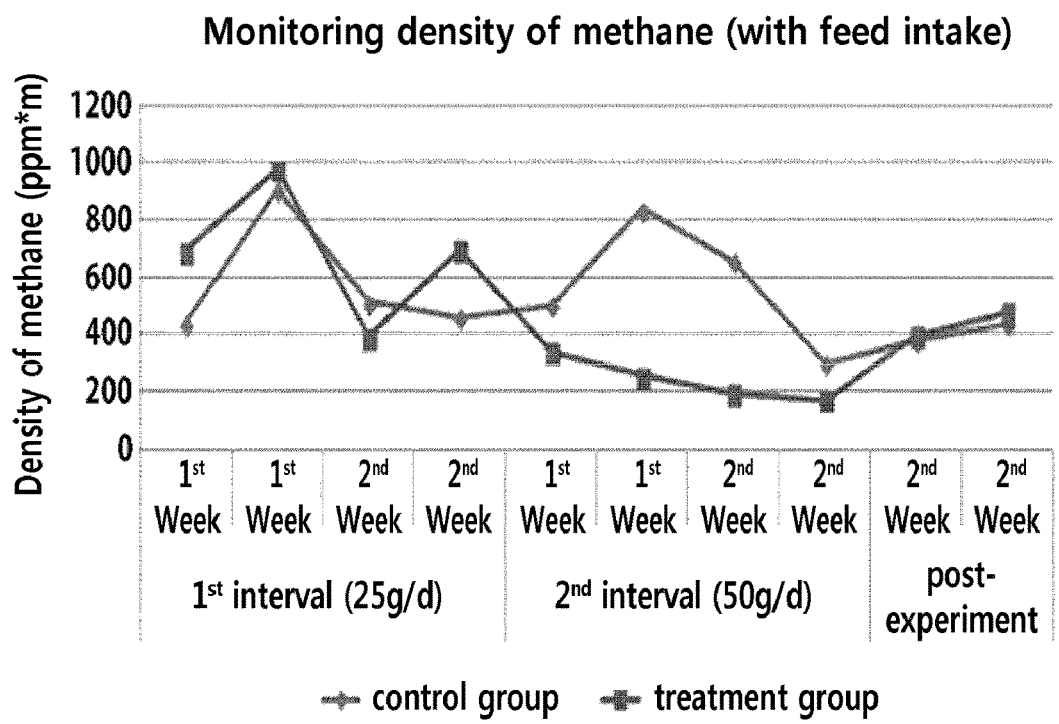

FEED ADDITIVE COMPOSITION FOR REDUCING METHANE GAS PRODUCED BY RUMINANT ANIMALS

TECHNICAL FIELD

The present disclosure relates to a feed additive composition for reducing methane produced in the ruminant stomach of ruminant animals. Specifically, the present disclosure relates to a feed additive composition for reducing methane production comprising at least one selected from the group consisting of alliin and berberine. The feed additive composition may further comprise at least one selected from the group consisting of diallyl disulfide (DADS), nitrate, and eucalyptus oil.

BACKGROUND ART

As a result of a recent increase in human population, the demand for food is projected to rise more than 70% in 2050 (FAO, 2009), and twice as much livestock products, that is, meat and dairy products, are projected to be produced in order to meet the demand. However, the livestock industry, especially the ruminant animal industry, has recently been recognized to have a negative impact on the regional and global environment. An intensive livestock industry contributes to air, soil, water, and other environmental pollution regionally, and is known as a major causal factor of greenhouse gases in terms of the global environment. In particular, Livestock's Long Shadow (Steinfeld et al., 2006) released by the FAO in 2006, specifically reported the impact of the livestock industry on the environment.

The amount of annual greenhouse gas emissions generated in the livestock industry is predicted to be about 4.1 to 7.1 billion tons of $CO_2$ equivalents, which is equivalent to about 15% to 24% of total greenhouse gas emissions (Steinfeld et al., 2006). The amounts of carbon dioxide, methane, and nitrous oxide generated by livestock account for 9%, 35% to 40%, and 65%, respectively, of the total emissions generated by human-related activities, thereby reaching a serious level.

As is known, most methane and nitrous oxide are generated from farming livestock. The feed consumed by ruminant animals is decomposed into volatile fatty acids, hydrogen, carbon dioxide, and ammonia nitrogen by fermentation of anaerobic microorganisms (bacteria, protozoa, and fungi) in the ruminant stomach, and the hydrogen and carbon dioxide are converted to methane by methanogenic bacteria. The methane is then released into the atmosphere, and not absorbed into the body. A recent study conducted by a research team in New Zealand has shown that 80% of greenhouse gases are from farms, only 3% are from meat processing after slaughter, 5% are from meat transportation, and lastly, 12% are from the phase of consumption by consumers (Ledgard et al., 2010). Additionally, feed energy is lost (2% to 15%) when nutrients are converted into methane in a gaseous form. Accordingly, research for reducing methane production in the ruminant stomach of the ruminant animals has been continuously conducted to enhance productivity of livestock and reduce greenhouse gases which are harmful to the environment.

Currently, as a method for reducing methane gas production of ruminant animals, addition of an antibiotic such as monensin into the feed, elimination of protozoa in the ruminant stomach, addition of a halogen compound into the feed, or feeding of probiotics has been studied.

However, the addition of the antibiotic to the feed to inhibit the methane production is considered to be inappropriate, as the global trend is to restrict use of chemicals or antibiotics as feed additives, and residue thereof may be harmful to the human body. The elimination of protozoa may lead to a reduction of a cellulose level, and the addition of halogen compounds to the feed may lead to a discontinuation of methane gas inhibition, as well as safety issues such as halogen accumulation in the livestock. Further, the feeding of probiotics may have problem with inconsistency in probiotic fermentations and strains added during every experiment of methane gas production.

Meanwhile, Korean Patent Application Publication No. 10-2006-0019062 discloses a feed composition for inhibiting methane production of ruminant animals. The patent has a technical feature in that methane gas production of the ruminant animals is reduced by feeding the ruminant animals the feed composition comprising at least one selected from the group consisting of ginger, chive extracts, and conjugated linoleic acids. However, as the feed composition comprising the ginger, chive extracts, and conjugated linoleic acids requires an additional preparation process, the feed composition is not readily available. Also, the feed composition has problem with increase of purchase costs due to high preparation costs.

Therefore, a technique for efficiently reducing methane gas which is harmful to the environment, while minimizing the negative impact on livestock productivity is needed.

DISCLOSURE

Technical Problem

In the course of research on feed additives that may safely and efficiently reduce methane production, the present inventors have completed the present disclosure by confirming that diallyl disulfide, alliin, nitrate, berberine, eucalyptus oil, or a mixture thereof show a significant methane reduction rate compared to a control group, when they are cultured in a Rumen simulation continuous culture system (RSCC) which has the same environment as the ruminant stomach.

Technical Solution

An object of the present disclosure is to provide a feed additive composition for safely and efficiently reducing methane production comprising at least one selected from the group consisting of diallyl disulfide, alliin, nitrate, berberine, and eucalyptus oil.

Another object of the present disclosure is to provide a method for reducing methane production including administering the feed additive composition to a subject.

Advantageous Effects

Since the feed additive composition of the present disclosure is added to a feed without an additional treatment process, thereby reducing methane production in the ruminant stomach without having a negative impact on livestock productivity, it may be very useful in the ruminant animal industry.

BRIEF DESCRIPTION OF DRAWINGS

FIG. 1 is a graph showing a methane reduction rate of diallyl disulfide (DADS) according to an exemplary embodiment of the present disclosure.

FIG. 2 is a graph showing a methane reduction rate of alliin according to an exemplary embodiment of the present disclosure.

FIG. 3 is a graph showing a methane reduction rate of nitrate according to the amount of nitrate added according to an exemplary embodiment of the present disclosure.

FIG. 4 is a graph showing a methane reduction rate of eucalyptus oil according to an exemplary embodiment of the present disclosure.

FIG. 5 is a graph showing a methane reduction rate depending on the addition amount of berberine according to an exemplary embodiment of the present disclosure.

FIG. 6 is a graph showing a methane reduction rate depending on the addition amount of a mixture composition comprising DADS, nitrate, eucalyptus oil, and berberine according to an exemplary embodiment of the present disclosure.

FIG. 7 is a graph showing a methane reduction rate depending on the addition amount of a mixture composition comprising alliin, nitrate, eucalyptus oil, and berberine according to an exemplary embodiment of the present disclosure.

FIG. 8 is a graph showing a methane reduction rate depending on the addition amount of a mixture composition comprising DADS, nitrate, eucalyptus oil, and berberine according to an exemplary embodiment of the present disclosure.

BEST MODE FOR CARRYING OUT THE INVENTION

In order to achieve the above objects, an aspect of the present disclosure provides a feed additive composition for reducing methane production including at least one selected from the group consisting of alliin and berberine.

Additionally, the composition of the present disclosure is added to the feed to comprise alliin in an amount of 0.005 wt % to 5 wt % and berberine in an amount of 0.005 wt % to 5 wt % relative to the weight of dried feed.

As used herein, the term "alliin" refers to ((2R)-2-amino-3-[(S)-prop-2-enylsulfinyl] propanoic acid, a garlic or onion odor component of the garlic or onions. The above feed additive composition comprises alliin at from 1 wt % to 100 wt %, specifically from 10 wt % to 90 wt %, and more specifically from 20 wt % to 80 wt %, but is not limited thereto.

As used herein, the term "berberine" refers to 5,6-dihydro-9,10-dimethoxybenzo[g]-1,3-benzodioxolo[5,6-a] quinolizinium, a quaternary ammonium salt which belongs to the protoberberine group of isoquinoline alkaloids. The feed additive composition may comprise berberine at from 1 wt % to 100 wt %, specifically from 10 wt % to 90 wt %, and more specifically from 20 wt % to 80 wt %, but is not limited thereto.

As used herein, the term "methane" refers to methane gas ($CH_4$) which is released from decomposition of various organic materials and is known to be a major contributor to global warming. In particular, carbohydrates are converted into volatile fatty acids and methane gas while various microorganisms in the ruminant stomach ferment feed. The converted methane gas accounts for about a quarter of the entire methane gas emission of the world. About 10% of the energy of feed intake is lost due to methane production in the ruminant stomach. In other words, fermentation gas emission including methane produced in the ruminant stomach causes not only global warming but also a reduction in energy absorption efficiency of livestock, and therefore, low productivity of livestock.

According to an exemplary embodiment of the present disclosure, when alliin was added at a ratio of 0.5 wt % per 10 g of a substrate using an RSCC system, a methane reduction rate was 21.9%, which is lower than when diallyl disulfide was added, but pH was maintained similarly to the control group. This showed that alliin had a lower methane reduction effect than diallyl disulfide, but was more effective in stabilization of the inside of the ruminant stomach.

According to another exemplary embodiment of the present disclosure, when berberine was added at ratios of 0.1 wt %, 0.2 wt %, and 0.5 wt % per 10 g of a substrate using an RSCC system, methane reduction rates were 6.7%, 12.4%, and 45.5%, respectively. When berberine was added at a ratio of 0.5 wt %, a Dry Matter Digestibility decreased significantly even though the methane reduction rate was high enough to be 45.5%. This showed that adding berberine at a ratio of below 0.5 wt % seemed to be appropriate.

Additionally, the composition of the present disclosure may comprise at least one selected from the group consisting of diallyl disulfide (DADS), nitrate, and eucalyptus oil.

As used herein, the term "diallyl disulfide (DADS)" refers to 4,5-dithia-1,7-octadiene diallyldisulfide, which is effective in sterilization and antibacterial performance as well as blood circulation improvement. It is also known to be outstandingly effective in preventing high blood pressure, arteriosclerosis, angina, myocardial infarction, stroke, and other adult diseases; and cancer. The feed additive composition may comprise diallyl disulfide at from 1 wt % to 90 wt %, and specifically from 20 wt % to 80 wt %, but is not limited thereto.

As used herein, the term "nitrate" generally refers to nitrate ion ($NO_3^-$) compounds, and includes sodium nitrate, potassium nitrate, calcium nitrate, and ammonium nitrate, but is not limited thereto. The feed additive composition may comprise nitrate at from 1 wt % to 90 wt %, and specifically from 20 wt % to 80 wt %, but is not limited thereto.

As used herein, the term "eucalyptus oil" refers to refined oil distilled from foliage of eucalyptus. The eucalyptus oil is a refreshing, almost colorless to yellow, clear liquid with a pungent odor and a spicy flavor. The feed additive composition may comprise eucalyptus oil at from 1 wt % to 90 wt %, and specifically from 20 wt % to 80 wt %, but is not limited thereto.

The composition of the present disclosure may be added to a feed to specifically comprise diallyl disulfide in an amount of 0.005 wt % to 4 wt %, alliin in an amount of 0.005 wt % to 5 wt %, nitrate in an amount of 0.01 wt % to 0.5 wt %, berberine in an amount of 0.005 wt % to 5 wt %, and eucalyptus oil in an amount of 0.01 wt % to 5 wt % relative to the weight of dried feed, but is not limited thereto. If nitrate is added at a ratio of higher than 0.5 wt %, a health problem such as nitrite accumulation or nitrate poisoning syndrome may be developed.

According to an exemplary embodiment of the present disclosure, when diallyl disulfide was added at ratios of 0.1 wt %, 0.2 wt %, and 0.4 wt % each per 10 g of a substrate using an RSCC system, methane reduction rates were 30.5%, 65.2%, and 65.9%, respectively. The methane reduction rates according to the amounts of diallyl disulfide added were compared. As a result, when diallyl disulfide was added at ratios of 0.2 wt % and 0.4 wt %, the methane reduction rates were similar at about 65%. This indicates that adding diallyl disulfide at a ratio of 0.2 wt % may be economically advantageous According to another exemplary embodiment of the present disclosure, when nitrates were added at ratios of 0.35 wt %, 0.5 wt %, and 1.0 wt % each per 10 g of a substrate using an RSCC system, methane reduction rates were 14.0%, 31.0%, and 8.1%, respectively.

According to another exemplary embodiment of the present disclosure, when eucalyptus oil was added at a ratio of 0.5 wt % per 10 g of a substrate using an RSCC system, methane reduction rate was 20.5%. This showed that eucalyptus oil at the same ratio as diallyl disulfide had a lower methane reduction effect but was more effective on the stabilization of the inside of the ruminant stomach.

In order to minimize side effects, the feed additive composition of the present disclosure may include a mixture of the active ingredients. Having a synergistic effect, the mixture composition in a small amount may have a significant methane reduction effect.

Additionally, as a specific embodiment, the composition may comprise diallyl disulfide, nitrate, berberine, and eucalyptus oil. The contents of diallyl disulfide, nitrate, berberine, and eucalyptus oil are as described above.

Specifically, the composition may comprise diallyl disulfide in an amount of 0.005 wt % to 4 wt %, nitrate in an amount of 0.01 wt % to 0.5 wt %, berberine in an amount of 0.005 wt % to 5 wt %, and eucalyptus oil in an amount of 0.01 wt % to 5 wt % relative to the weight of dried feed.

According to an exemplary embodiment of the present disclosure, when a mixture composition including diallyl disulfide, nitrate, berberine, and eucalyptus oil at a ratio of 0.05 wt %, 0.2 wt %, 0.05 wt %, and 0.2 wt %, respectively, relative to the weight of dried feed, was used as feed additive, it was confirmed to have an effective methane reduction rate of 56.2%. Also, it was confirmed to have a significant methane reduction effect although a small amount of the composition having different mixture ratio was used as an additive.

Additionally, according to an exemplary embodiment of the present disclosure, feeding 25 g/d and 50 g/d of the feed compositions for methane reduction (diallyl disulfide:nitrate:berberine:eucalyptus oil=0.05 wt %:0.1 wt %:0.05 wt %:0.1 wt %) to milking cows resulted in effective methane reduction rates of 23.1% and 36.6%, respectively. Milk quantity also did not decreased compared to the control group while increased by 1.1% or higher, confirming that the mixture composition for methane reduction has no negative impact on fermentation in the ruminant stomach.

Additionally, as another specific embodiment, the composition may comprise alliin, nitrate, berberine, and eucalyptus oil. The contents of alliin, nitrate, berberine, and eucalyptus oil are as described above.

Specifically, the above composition may comprise alliin in an amount of 0.005 wt % to 5 wt %, nitrate in an amount of 0.01 wt % to 0.5 wt %, berberine in an amount of 0.005 wt % to 5 wt %, and eucalyptus oil in an amount of 0.01 wt % to 5 wt % relative to the weight of dried feed.

According to an exemplary embodiment of the present disclosure, the methane reduction rate showed a greater increase when nitrate and eucalyptus oil in the same amount of 0.1 wt % or 0.2 wt %, and 0.05 wt % of each of alliin and berberine were added, than when the each additive was added individually, confirming a synergistic effect.

A subject to which the feed additive composition for methane reduction may be applied is not limited, and any form of subject may be applied. For example, the feed additive composition may be applied without limitation to animals such as cows, sheep, giraffes, camels, deer, and goats, and specifically to ruminant animals with the ruminant stomach.

As used herein, the term "ruminant stomach", also known as "reticulo-rumen", refers to a unique digestive tract observed in some animals which belong to a family of artiodactyl mammals, and is composed of four compartments: rumen, reticulum, omasum, and abomasum. The "ruminant" means regurgitating and chewing food that has already been swallowed, and then swallowing the food again. The stomach which enables ruminating is the ruminant stomach. Symbiotic microorganisms in the ruminant stomach enable the ruminant stomach to decompose cellulose, which is indigestible in general animals, to use the cellulose as an energy source.

As used herein, the term "ruminant animals" refers to the animals which have the ruminant stomach described above, and includes camelidae, tragulidae, cervidae, giraffidae, and bovidae. The camelidae and tragulidae are known to have a three-chambered ruminant stomach, as the omasum and abomasum are not completely differentiated.

The feed additive composition according to the present disclosure may be used individually or in combination with the feed additives conventionally known in the art, either sequentially or concurrently.

The feed additive composition according to the present disclosure may comprise not only a physiologically acceptable salt of alliin, berberine, or diallyl disulfide, but also any solvate or hydrate which may be prepared therefrom, or all possible stereoisomers. Additionally, the solvate, hydrate, and stereoisomer of the alliin, berberine, or diallyl disulfide may be prepared using conventional methods.

As used herein, the term "physiologically acceptable" refers to being acceptable physiologically, not causing an allergic reaction or any symptoms similar thereto such as stomach disorders and dizziness, and exhibiting an intended effect of a compound when is administered in an organism.

Additionally, the alliin, berberine, and diallyl disulfide may be obtained by natural products, chemical synthesis, and fermentation of microorganisms as well as those available on the market.

Another aspect of the present disclosure provides a method for reducing methane production including administering the composition to a subject.

MODES FOR CARRYING OUT THE INVENTION

Hereinafter, the present disclosure will be described in more detail with reference to the following examples, comparative examples, and experimental examples. However, the following examples are provided for illustrative purposes only, and the scope of the present disclosure should not be limited thereto.

Preparation Example: Rumen Simulation Continuous Culture System (RSCC)

1) Buffer Preparation (Per 1 L)

0.12 mL of a micromineral solution was added to 250 mL of distilled water in an 2 L of Erlenmeyer flask and stirred. Another 250 mL of distilled water was added, and then stirred for 20 minutes. Then, 250 mL of an in vitro buffer solution was added and stirred for 10 minutes. Then, 250 mL of a macromineral solution was added and stirred for 15 minutes. Then, 1.25 mL of a resazurin solution was added to the mixture and stirred. Then, the flask was sealed with aluminum foil and heated while maintaining an anaerobic condition by bubbling $CO_2$ gas in a Hungate anaerobic culture tube. When the solution started boiling, the solution was heated for 10 more minutes and then cooled down. 50 mL of a reduction solution was added to the cooled solution to obtain a buffer. The buffer solution was confirmed to become colorless.

2) Culture Medium Preparation

A sampled rumen fluid was first filtered through eight-layer gauze and then through glass wool. The filtered rumen fluid was maintained in an anaerobic condition by $CO_2$ bubbling. While maintaining the anaerobic condition by $CO_2$ bubbling, the buffer solution prepared in 1) above was mixed with the rumen fluid (250 mL of the rumen fluid, 600 mL of the buffer solution).

3) RSCC System Operation Methods and Test Operation 10 g of a substrate was added to a fermenter. The buffer solution prepared in 1) was added into a buffer bag while maintaining the anaerobic condition. A Tedlar bag filled with $CO_2$ gas was connected to the buffer bag, and a tube connected to the buffer bag was connected to a buffer inlet port of the fermenter lid. Then a tube connected to a gas collecting bag was connected to a gas collecting port of the fermenter lid (a tube for gas was used). A pH probe and a temperature probe were placed deep enough to reach the culture medium while not touching the impellers. In the meantime, a feed inlet tube was placed deep enough to reach the culture medium through the feeding port of the fermenter lid. The fermenter lid was then connected to the fermenter and an anaerobic condition inside the fermenter was maintained by using vacuum grease and Teflon tape. $CO_2$ gas was introduced into the fermenter through the gas collecting port for about 10 minutes (making the inside of the fermenter anaerobic, continuously introducing $CO_2$ gas until the initiation of cultivation). All joint connections were sealed with vacuum grease and Teflon tape. Once all devices were installed, a peristaltic pump was activated and the buffer solution was introduced into the fermenter. The anaerobic culture medium was introduced into the fermenter until it overflowed, and then the $CO_2$ gas introduction into the fermenter was discontinued and all inlet ports were sealed. The fermenter was then connected to a circulator, and cultivation started at 39° C. with a stirring speed between 99 rpm and 102 rpm. The pH of the culture medium of the fermenter was between 6.8 and 7.1, and a temperature was maintained at between 39° C. and 40° C. A turnover rate of the culture medium was stabilized at 0.042 $h^{-1}$ while a turnover rate of the substrate was stabilized at 0.017 $h^{-1}$.

Example 1: Effect on Reduction of Methane Production by a Feed Additive for Reducing Methane Below is an experiment on reduction of methane production conducted in accordance with the above operation method using the RSCC system of 3) of Preparation Example. A feed additive for reducing methane was added with the substrate when the substrate was added.

1) Effect on Reduction of Methane Production by the Addition Amount of Diallyl Disulfide (DADS)

The RSCC system was operated for five days of adjustment, and then total gas production, methane production, and pH values of the control group were measured for three days. After the measurements of the control group were completed, DADS was added at ratios of 0.1 wt %, 0.2 wt %, and 0.4 wt % per 10 g of a substrate, and then total gas production, methane production, and pH values were measured at the same time for another three days. The methane reduction rate was measured after having an adjustment period with a newly sampled rumen fluid every time one additive examines. The results are as shown in Table 1 below and FIG. 1.

TABLE 1

| | Continuous Culture | | |
| --- | --- | --- | --- |
| | DADS 0.1 wt % | DADS 0.2 wt % | DADS 0.4 wt % |
| pH | 6.71 | 6.63 | 6.58 |
| Methane Reduction (%) | 30.5 | 65.2 | 65.9 |

As shown in Table 1 above and FIG. 1, pH values decreased as more DADS was added, and methane emission decreased by 30.5%, 65.2%, and 65.9%, respectively, compared to the control group. The methane reduction rates were compared depending on the addition amount of DADS. As a result, the methane reduction rates for 0.2 wt % and 0.4 wt % of DADS were similar at about 65%, indicating that adding 0.2 wt % of diallyl disulfide was economically advantageous.

2) Effect on Reduction of Methane Production by Alliin

The RSCC system was operated for five days of adjustment and then total gas production, methane production, and pH values of the control group were measured for three days. After the measurements of the control group were completed, alliin was added at a ratio of 0.5 wt % per 10 g of a substrate, and then total gas production, methane production, and pH values were measured at the same time for another three days. The methane reduction rate was measured after having an adjustment period with a newly sampled rumen fluid every time one additive examines. The results are as shown in Table 2 below and FIG. 2.

TABLE 2

| | Continuous Culture Alliin 0.5 wt % |
| --- | --- |
| pH | 6.84 |
| Methane Reduction (%) | 21.9 |

As shown in Table 2 above and FIG. 2, a methane reduction rate of alliin was 21.9%, which was lower that of DADS of Example 1), but a pH value was similar to that of the control group. Accordingly, alliin showed a lower methane reduction effect than DADS whereas the stabilization inside the ruminant stomach was more effective than DADS.

3) Effect on Reduction of Methane Production by the Addition Amount of Nitrate

The RSCC system was operated for five days of adjustment and then total gas production, methane production, and pH values of the control group were measured for three days. After the measurements of the control group were completed, nitrate was added at ratios of 0.35 wt %, 0.5 wt %, and 1.0 wt % per 10 g of a substrate, and then total gas production, methane production, and pH values were measured at the same time for another three days. The methane reduction rate was measured after having an adjustment period with a newly sampled rumen fluid every time one additive examines. The results are as shown in Table 3 below and FIG. 3.

TABLE 3

| | Continuous Culture | | |
|---|---|---|---|
| | Nitrate 0.35 wt % | Nitrate 0.5 wt % | Nitrate 1.0 wt % |
| pH | 6.63 | 6.65 | 6.57 |
| Methane Reduction (%) | 14.0 | 31.0 | 8.1 |

As shown in Table 3 above and FIG. 3, when 0.5 wt % of nitrate was added, the largest methane reduction rate was measured.

4) Effect on Reduction of Methane Production by Eucalyptus Oil

The RSCC system was operated for five days of adjustment and then total gas production, methane production, and pH values of the control group were measured for three days. After the measurements of the control group were completed, eucalyptus oil was added at a ratio of 0.5 wt % per 10 g of a substrate, and then total gas production, methane production, and pH values were measured at the same time for another three days. The results are as shown in Table 4 below and FIG. 4.

TABLE 4

| | Continuous Culture<br>Eucalyptus oil 0.5 wt % |
|---|---|
| pH | 6.46 |
| Methane Reduction (%) | 20.5 |

As shown in Table 4 above and FIG. 4, the methane reduction rate of eucalyptus oil was measured at 20.5%, which was similar to that of 0.5 wt % alliin of 2). As with alliin, eucalyptus oil showed a lower methane reduction effect than DADS, but the stabilization inside the ruminant stomach was more effective than DADS.

5) Effect on Reduction of Methane Production by Berberine

The RSCC system was operated for five days of adjustment and then total gas production, methane production, and pH values of the control group were measured for three days. After the measurements were completed, berberine was added at ratios of 0.1 wt %, 0.2 wt %, and 0.5 wt % per 10 g of a substrate, and then total gas production, methane production, and pH values were measured at the same time for another three days. The methane reduction rate was measured after having an adjustment period with a newly sampled rumen fluid every time one additive examines. The results are as shown in Table 5 below and FIG. 5.

TABLE 5

| | Continuous Culture | | |
|---|---|---|---|
| | Berberine 0.1 wt % | Berberine 0.2 wt % | Berberine 0.5 wt % |
| pH | 6.43 | 6.44 | 6.49 |
| Methane Reduction (%) | 6.7 | 12.4 | 45.5 |

As shown in Table 5 above and FIG. 5, when 0.5 wt % of berberine was added, the largest methane reduction rate, 45.5%, was measured, but the Dry Matter Digestibility significantly decreased. Accordingly, adding berberine in an amount below 0.5 wt % was considered to be appropriate.

6) Effect on Reduction of Methane Production by an Additive Mixture Composition of Diallyl Disulfide, Nitrate, Berberine, and Eucalyptus Oil When DADS, nitrate, berberine, and eucalyptus oil having a methane reduction effect with its own distinctive mechanism were mixed and added, a synergistic effect for methane reduction was observed. The methane reduction effects were measured when nitrate and eucalyptus oil in the same amount of 0.1 wt % or 0.2 wt %, and 0.05 wt % of each of DADS and berberine were added. The RSCC system was operated for five days of adjustment and then total gas production, methane production, and pH values of the control group were measured for three days. After the measurements f the control group were completed, a additive mixture of DADS, nitrate, berberine, and eucalyptus oil was added at a ratio of 0.3 wt % or 0.5 wt % per 10 g of a substrate, and then total gas production, methane production, and pH values were measured at the same time for another three days. The methane reduction rate was measured after having an adjustment period with a newly sampled rumen fluid every time one additive examines. The results are as shown in Table 6 and FIG. 6 below.

TABLE 6

| | Continuous Culture | |
|---|---|---|
| | DADS:Nitrate:Berberine:*Eucalyptus* Oil = 0.05 wt %:0.1 wt %:0.05 wt %:0.1 wt % | DADS:Nitrate:Berberine:*Eucalyptus* Oil = 0.05 wt %:0.2 wt %:0.05 wt %:0.2 wt % |
| pH | 6.72 | 6.72 |
| Methane Reduction (%) | 45.2 | 56.2 |

As shown in Table 6 above and FIG. 6, the methane reduction rate increased significantly when an additive mixture of DADS, nitrate, berberine, and eucalyptus oil was added compared to when each additive was added individually. The methane production decreased because DADS and berberine inhibited methanogen growth, nitrate preoccupied competitively hydrogen for methanogenesis, and eucalyptus oil decreased the number of protozoa. As a result of mixing the four additives, the methane reduction rate of the additive mixture was 45% or higher through a synergistic effect although a small amount of each of the four additives is added in the additive mixture.

7) Effect on Reduction of Methane Production by an Additive Mixture Composition of Alliin, Nitrate, Berberine, and Eucalyptus Oil The methane reduction effect was measured to confirm a synergistic effect of an additive mixture of the four components to which alliin was added instead of DADS among the four additives described in 6) above. The methane reduction effects were measured when nitrate and eucalyptus oil in the same amount of 0.1 wt % or 0.2 wt %, and 0.05 wt % of each of alliin and berberine were added. The RSCC system was operated for five days of adjustment and then total gas production, methane production, and pH values of the control group were measured for three days. After the measurements of the control group were completed, a additive mixture of alliin, nitrate, berberine, and eucalyptus oil was added at a ratio of 0.3 wt % or 0.5 wt % per 10 g of a substrate, and then total gas production, methane production, and pH values were measured at the same time for another three days. The methane reduction rate was measured after having an adjustment period with a newly sampled rumen fluid every time one additive examines. The results are as shown in Table 7 below and FIG. 7.

TABLE 7

| | Continuous Culture | |
|---|---|---|
| | Alliin:Nitrate:Berberine:*Eucalyptus* Oil = 0.05 wt %:0.1 wt %:0.05 wt %:0.1 wt % | Alliin:Nitrate:Berberine:*Eucalyptus* Oil = 0.05 wt %:0.2 wt %:0.05 wt %:0.2 wt % |
| pH | 6.68 | 6.69 |
| Methane Reduction (%) | 22.0 | 30.2 |

As shown in Table 7 above and FIG. 7, the methane reduction rate increased significantly when an additive mixture of DADS, nitrate, berberine, and eucalyptus oil was added compared to when each ingredient was added individually, confirming a synergistic effect. Additionally, compared with the methane reduction rates for the additive mixture of 6) and 7) of Example 1, it was confirmed that DADS was more effective in methane reduction than alliin.

Example 2: Effect of a Feed Additive for Reducing Methane on Productivity of Milking Cows and Methane Production within the Ruminant Stomach Below is an feeding experiment on milking cow conducted to verify a methane reduction effect of the additive mixture composition (power-green premix), described in 6) of Example 1, comprising DADS, nitrate, berberine, and eucalyptus oil; and to examine an effect of the power-green premix on the dairy farming productivity as well. Methane production from milking cows was monitored in real time using a laser methane detector.

1) Effect of the power-green premix (additive mixture composition comprising alliin, nitrate, berberine, and eucalyptus oil) on the methane production within the ruminant stomach of milking cows In order to verify the effect of the power-green premix (DADS:Nitrate:Berberine:Eucalyptus Oil=0.05 wt %:0.1 wt %:0.05 wt %:0.1 wt %) described in 6) of Example 1 on the methane reduction, 40 heads of milking cows were divided into a control group (20 heads) and a treatment group (20 heads). The power-green premix was fed in a form of topdressing to the treatment group during the experiment period. The feed amounts of the power-green premix in each interval are shown in Table 8.

TABLE 8

| | Control group (20 heads) | Treatment group (20 heads) |
|---|---|---|
| 1st Interval (Week 2) | Power-green premix 0 g/d | Power-green premix 25 g/d |
| 2nd Interval (Week 2) | Power-green premix 0 g/d | Power-green premix 50 g/d |

A laser methane detector is an experimental device which detects methane in the atmosphere with infrared absorption spectroscopy using semiconductor laser, and was used to measure an amount of methane released by milking cows on different groups when milking cows took in a feed. The detection distance was 30 m, and methane density data was measured every second for five minutes.

As a result of continuously feeding the power-green premix to the milking cows, the methane reduction effect was proportional to the amount of the power-green premix added. In the first interval where 25 g/d of the power-green premix per a head was fed to, methane reduction rate was measured at 23.1%, whereas i was measured at 36.6% in the second interval where 50 g/d of the power-green premix per a head was fed to (Table 9).

TABLE 9

| Treatment | Methane Reduction (%) |
|---|---|
| 1st Interval (Power-green premix 25 g/d) | 23.1 |
| 2nd Interval (Power-green premix 50 g/d) | 36.6 |

As shown in Table 9 above and FIG. 8, the power-green premix, i.e., the additive mixture composition, showed methane reduction effects in the ruminant stomach of ruminant animals in vitro as well as in vivo.

2) Effect of the power-green premix (additive mixture composition comprising alliin, nitrate, berberine, and eucalyptus oil) on the productivity of the milking cows In order to measure the effects of the power-green premix, described in 6) of Example 1, on the productivity of the milking cows as well as the methane reduction, changes in milk quantities between the control group and the treatment group were analyzed. The group information and the milk quantities are shown in Table 10.

TABLE 10

| Group Information | | | Milk Quantity (kg) | |
|---|---|---|---|---|
| Group | Calving No. | No. of Non-milking Days | 1st Interval | 2nd Interval |
| Control group | 2.4 | 225 | 30.6 | 29.4 |
| Treatment group | 2.5 | 243 | 31.2 | 29.8 |
| Improvement Rate of Milk Quantity (%) | | | 2.0% | 1.1% |

As shown in Table 10 above, the milk quantity of the treatment group fed on the power-green premix did not decrease compared to the control group, but rather increased by 1.1%. The result showed that feeding the power-green premix in an amount from 25 g/d to 50 g/d had no negative impact on the fermentation in the ruminant stomach.

Based on the above description, it should be understood by one of ordinary skill in the art that other specific embodiments may be employed in practicing the invention without departing from the technical idea or essential features of the present disclosure. In this regard, the above-described examples are for illustrative purposes only, and the invention is not intended to be limited by these examples. The scope of the present disclosure should be understood to include all of the modifications or modified forms derived from the meaning and scope of the following claims or its equivalent concepts, rather than the above detailed description.

The invention claimed is:

1. A feed additive composition for reducing methane production comprising berberine, nitrate, and eucalyptus oil, wherein the composition is added to a feed to comprise berberine in an amount of 0.01 wt % to 5 wt % relative to the weight of dried feed.

2. The composition according to claim 1, wherein the composition is added to a feed to comprise nitrate in an amount of 0.01 wt % to 0.5 wt %, and eucalyptus oil in an amount of 0.01 wt % to 5 wt % relative to the weight of dried feed.

3. The composition according to claim 1, wherein the composition further comprises at least one selected from the group consisting of diallyl disulfide (DADS) and alliin.

4. The composition according to claim 3, wherein the composition is added to a feed to comprise diallyl disulfide in an amount of 0.005 wt % to 4 wt % or alliin in an amount of 0.005 wt % to 5 wt % relative to the weight of dried feed.

5. The composition according to claim 4, wherein the composition is added to a feed to comprise diallyl disulfide in an amount of 0.005 wt % to 4 wt %, nitrate in an amount of 0.01 wt % to 0.5 wt %, berberine in an amount of 0.01 wt % to 5 wt %, and eucalyptus oil in an amount of 0.01 wt % to 5 wt % relative to the weight of dried feed.

6. The composition according to claim 4, wherein the composition is added to a feed to comprise alliin in an amount of 0.005 wt % to 5 wt %, nitrate in an amount of 0.01 wt % to 0.5 wt %, berberine in an amount of 0.01 wt % to 5 wt %, and eucalyptus oil in an amount of 0.01 wt % to 5 wt % relative to the weight of dried feed.

7. A reducing method for of methane production comprising administering a composition comprising berberine to a subject.

8. The reducing method according to claim 7, wherein the composition is a feed additive composition and further comprises alliin.

9. The reducing method according to claim 8, wherein the composition is a feed additive composition and comprises berberine in an amount of 0.01 wt % to 5 wt % and alliin in an amount of 0.005 wt % to 5 wt % relative to the weight of dried feed.

10. The reducing method according to claim 7, wherein the composition further comprises at least one selected from the group consisting of diallyl disulfide (DADS), alliin, nitrate, and eucalyptus oil.

11. The reducing method according to claim 10, wherein the composition is a feed additive composition and comprise diallyl disulfide in an amount of 0.005 wt % to 4 wt %, alliin in an amount of 0.005 wt % to 5 wt %, nitrate in an amount of 0.01 wt % to 0.5 wt %, berberine in an amount of 0.01 wt % to 5 wt %, or eucalyptus oil in an amount of 0.01 wt % to 5 wt % relative to the weight of dried feed.

12. The reducing method according to claim 10, wherein the composition comprises diallyl disulfide, nitrate, berberine, and eucalyptus oil.

13. The reducing method according to claim 12, wherein the composition is a feed additive composition and comprises diallyl disulfide in an amount of 0.005 wt % to 4 wt %, nitrate in an amount of 0.01 wt % to 0.5 wt %, berberine in an amount of 0.01 wt % to 5 wt %, and eucalyptus oil in an amount of 0.01 wt % to 5 wt % relative to the weight of dried feed.

14. The reducing method according to claim 10, wherein the composition comprises alliin, nitrate, berberine, and eucalyptus oil.

15. A feed additive composition for reducing methane production comprising berberine, nitrate, and eucalyptus oil, wherein the composition is added to a feed to comprise berberine in an amount of 0.05 wt % to 5 wt % relative to the weight of dried feed.

16. The reducing method according to claim 13, wherein the composition is added to a feed to comprise alliin in an amount of 0.005 wt % to 5 wt %, nitrate in an amount of 0.01 wt % to 0.5 wt %, berberine in an amount of 0.01 wt % to 5 wt %, and eucalyptus oil in an amount of 0.01 wt % to 5 wt % relative to the weight of dried feed.

* * * * *